US012670239B2

(12) United States Patent     (10) Patent No.:   US 12,670,239 B2

Goergen et al.     (45) Date of Patent:    Jun. 30, 2026

(54) USING GLASS WEAVE MARKER STRUCTURE TO AUTHENTICATE PRINTED CIRCUIT BOARDS

(71) Applicant: Cisco Technology, Inc., San Jose, CA (US)

(72) Inventors: Joel Goergen, Soulsbyville, CA (US); Sam Gupta, Costa Mesa, CA (US); Dylan Thomas Walker, Austin, TX (US); Chirag K. Shroff, Cary, NC (US); Christopher Shannon Gourley, Sweetwater, TN (US); Rachel Marie Weeks, Knoxville, TN (US); Elizabeth Ann Kochuparambil, Morgan Hill, CA (US); Ronald Lee Shaffer, II, Knoxville, TN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1432 days.

(21) Appl. No.: 16/943,423

(22) Filed: Jul. 30, 2020

(65) Prior Publication Data

US 2021/0382967 A1     Dec. 9, 2021

Related U.S. Application Data

(60) Provisional application No. 63/034,640, filed on Jun. 4, 2020.

(51) Int. Cl.
  *G06F 21/31*     (2013.01)
  *G06V 20/00*     (2022.01)
  (Continued)

(52) U.S. Cl.
  CPC .............. *G06F 21/31* (2013.01); *G06V 20/80* (2022.01); *H04L 9/3234* (2013.01);
  (Continued)

(58) Field of Classification Search
  CPC ......... Y10T 428/24942; Y10S 428/901; B32B 17/00; B32B 17/02; B32B 17/04;
  (Continued)

(56) References Cited

U.S. PATENT DOCUMENTS

| | | | |
|---|---|---|---|
| 6,983,434 B1 | 1/2006 | Frank et al. | |
| 7,339,646 B2 | 3/2008 | Izawa et al. | |

(Continued)

FOREIGN PATENT DOCUMENTS

| | | |
|---|---|---|
| CN | 103164559 A | 6/2013 |
| CN | 105845594 A | 8/2016 |

(Continued)

OTHER PUBLICATIONS

Machine translation (Espacenet) of CN 109556509 A. Translated Feb. 1, 2024. (Year: 2024).*

(Continued)

*Primary Examiner* — Maria V Ewald
*Assistant Examiner* — Ethan A. Utt
(74) *Attorney, Agent, or Firm* — Edell, Shapiro & Finnan, LLC

(57)     ABSTRACT

An apparatus includes a printed circuit board (PCB) that includes a woven glass laminate layer. The woven glass laminate layer includes a plurality of glass bundles woven together, where a marker structure including at least one marker is defined within the woven glass laminate layer. A security chip is coupled with the PCB and includes memory that stores an authentication identifier of the PCB, where the authentication ID includes a representation of the marker structure.

22 Claims, 10 Drawing Sheets

(51) Int. Cl.

| | |
|---|---|
| *G06V 20/80* | (2022.01) |
| *H04L 9/32* | (2006.01) |
| *H05K 1/02* | (2006.01) |
| *H05K 1/03* | (2006.01) |

(52) U.S. Cl.
CPC ......... *H04L 9/3263* (2013.01); *H05K 1/0269* (2013.01); *H05K 1/0306* (2013.01); *G06V 20/95* (2022.01); *H05K 2203/16* (2013.01)

(58) Field of Classification Search
CPC ...... B32B 33/00; B32B 2457/08; H05K 1/00; H05K 1/02; H05K 1/0266; H05K 1/0269; H05K 1/03; H05K 1/0306; H05K 1/038; H05K 2203/16
USPC .......................................... 428/212, 426, 901
See application file for complete search history.

(56) References Cited

U.S. PATENT DOCUMENTS

| | | | |
|---|---|---|---|
| 8,304,659 B2 | 11/2012 | Goergen | |
| 8,793,631 B2 | 7/2014 | Wu et al. | |
| 9,887,847 B2 | 2/2018 | Bartley et al. | |
| 2017/0037546 A1* | 2/2017 | Lau | G06K 19/027 |
| 2017/0339780 A1* | 11/2017 | Bisson | H05K 1/0245 |
| 2018/0113974 A1 | 4/2018 | Boday et al. | |
| 2018/0174157 A1* | 6/2018 | Endress | G06K 19/0614 |
| 2019/0041458 A1 | 2/2019 | Koki et al. | |
| 2019/0219385 A1 | 7/2019 | Koul et al. | |
| 2019/0363068 A1* | 11/2019 | Hotta | H01L 24/80 |
| 2020/0029424 A1 | 1/2020 | Bisson et al. | |

FOREIGN PATENT DOCUMENTS

| | | | | |
|---|---|---|---|---|
| CN | 106683600 A | | 5/2017 | |
| CN | 107194058 A | | 9/2017 | |
| CN | 109556509 A | * | 4/2019 | G01B 11/00 |
| GB | 2460071 A | * | 11/2009 | G06K 19/07749 |
| JP | 2007119630 B2 | | 5/2007 | |
| WO | WO-2018173764 A1 | * | 9/2018 | H01L 23/485 |

OTHER PUBLICATIONS

Loyer et al., "Fiber Weave Effect: Practical Impact Analysis and Mitigation Strategies," DesignCon 2007, Jan. 29-Feb. 1, 2007, 28 pages.

Bogatin, et al., "A New Characterization Technique for Glass Weave Skew Sensitivity," DesignCon 2016, Jan. 19-21, 2016, 42 pages.

Bogatin, et al., "New Characterization Technique For Glassweave Skew," Published on Signal Integrity Journal, www.signalintegrityjournal.com, Mar. 2, 2017, 27 pages.

Nozadze, et al., "Effective channel budget technique for high-speed channels due to differential P/N skew," 2017 IEEE International Symposium on Electromagnetic Compatibility & Signal/Power Integrity (EMCSI), pp. 34-39, Aug. 7-11, 2017, 6 pages.

Nalla, et al., "Measurement and correlation-based methodology for estimating worst-case skew due to glass weave effect," 2017 IEEE International Symposium on Electromagnetic Compatibility & Signal/Power Integrity (EMCSI), pp. 187-192, Aug. 7-11, 2017, 6 pages.

Baek, et al., "New Technique to Quantify Differential P/N Glass Weave Skew for Effective System Design," DesignCon 2017, Jan. 31-Feb. 2, 2017, 22 pages.

Baek, et al., "Test Coupon Design Methodology to Measure the Worst Positive/Negative Skew on Warp and Fill Direction on Fiber Glass Weave for Differential Pair," IP.com Prior Art Database Technical Disclosure, http:/ip.com/IPCOM/000249398, Feb. 23, 2017, 8 pages.

Nalla, "Mitigation of glass weave skew using a combination of low DK spread glass, multi-ply dielectric and routing direction," Masters Theses, https://scholarsmine.mst.edu/masters_theses/7859, Jul. 2016, 63 pages.

Altera, "PCT Dielectric Material Selection and Fiber Weave Effect on High-Speed Channel Routing," AN-528-1.1, Application Note, Jan. 2011, 20 pages.

Shlepnev, et al., "Modelling Skew and Jitter induced by Fiber Weave effect in PCT dielectrics," 2014 IEEE International Symposium on Electromagnetic Compatibility (EMC), Aug. 2014, 23 pages.

Simonovich, "Practical Fiber Weave Effect Modeling," White Paper-Issue 2, http://lamsimenterprises.com/Practical_Fiber_Weave_Modeling_Iss2_Jan10-11.pdf, Jan. 2011, 24 pages.

Chen, Bei et al., "Effect of Fiber Weave Structure in Printed Circuit Boards on Signal Transmission Characteristics", Jan. 21, 2019, 10 pages.

Shroff, Chirag, "System Identity With Intent to Mitigate Critical Part Replacement", https://www.tdcommons.org/dpubs_series/2504, Sep. 19, 2019, 8 pages.

* cited by examiner

DURING OPERATIONS (E.G., MANUFACTURE, PROCESSING, USE) OF PCB, ACQUIRE REPRESENTATION OF MARKER STRUCTURE FOR PCB — 252

COMPARE ACQUIRED REPRESENTATION OF MARKER STRUCTURE WITH STORED AUTHENTICATION ID — 254

COMPARISON MATCH? — 256

NO

YES

AUTHENTICATION FAILED / OPERATIONS OF PCB HALTED — 258

AUTHENTICATION VERIFIED / OPERATIONS OF PCB CONTINUE — 257

USING GLASS WEAVE MARKER STRUCTURE TO AUTHENTICATE PRINTED CIRCUIT BOARDS

CROSS REFERENCE TO RELATED APPLICATION

This application claims priority under 35 U.S.C. § 119(e) to U.S. Provisional Patent Application Ser. No. 63/034,640, entitled "Using Glass Weave Marker To Authenticate Printed Circuit Boards", filed Jun. 4, 2020, the disclosure of which is incorporated herein by reference in its entirety for all purposes.

TECHNICAL FIELD

The present disclosure relates to printed circuit boards and, in particular, to providing glass weave markers within printed circuit boards.

BACKGROUND

Printed circuit boards can be easy to counterfeit. Products are often easily copied, along with basic security methods, and are then sold as legitimate products. Supply chains can involve replacement of components (e.g., Central Processing Units (CPUs), Application Specific Integrated Circuits (ASICs), Systems-on-Chips (SoCs), etc.) on a printed circuit board (PCB) or even replacement of the PCB itself by counterfeit entities during the production and throughout the supply chain and life cycle of a product. This type of counterfeiting results in lost revenue for the manufacturer as well as others in the supply, distribution and/or marketing chains. In addition, and of greater importance, such counterfeited boards typically result in poor product performance as well as insecure products for customers. It is desirable to provide an accurate, reliable and secure authentication for printed circuit boards to identify counterfeit printed circuit boards in order to prevent their circulation and/or implementation within electronic products for consumers.

DESCRIPTION OF EXAMPLE EMBODIMENTS

Overview

In an embodiment, an apparatus comprises a printed circuit board (PCB) comprising a woven glass laminate layer, the woven glass laminate layer comprising a plurality of glass bundles woven together. A marker structure comprising at least one marker is defined within the woven glass laminate layer. In addition, a security chip is coupled with the PCB and comprises memory that stores an authentication identifier (ID) of the PCB, where the authentication ID comprises a representation of the marker structure.

In another embodiment, a method comprises obtaining a representation of a marker structure defined within a printed circuit board (PCB), where the PCB comprises a woven glass laminate layer comprising a plurality of glass bundles woven together, and the marker structure comprises at least one marker provided within the woven glass laminate layer. The method further comprises storing the representation of the marker structure as an authentication identifier (ID) within a security chip coupled with the PCB.

In a further embodiment, a method comprises obtaining a representation of a marker structure defined within a printed circuit board (PCB), where the PCB comprises a woven glass laminate layer comprising a plurality of glass bundles woven together, and the marker structure comprises at least one marker provided within the woven glass laminate layer. The method further comprises comparing the representation of the marker structure with an authentication identifier (ID) to determine whether a match exists between the representation of the marker structure and the authentication ID.

EXAMPLE EMBODIMENTS

Figure 1:
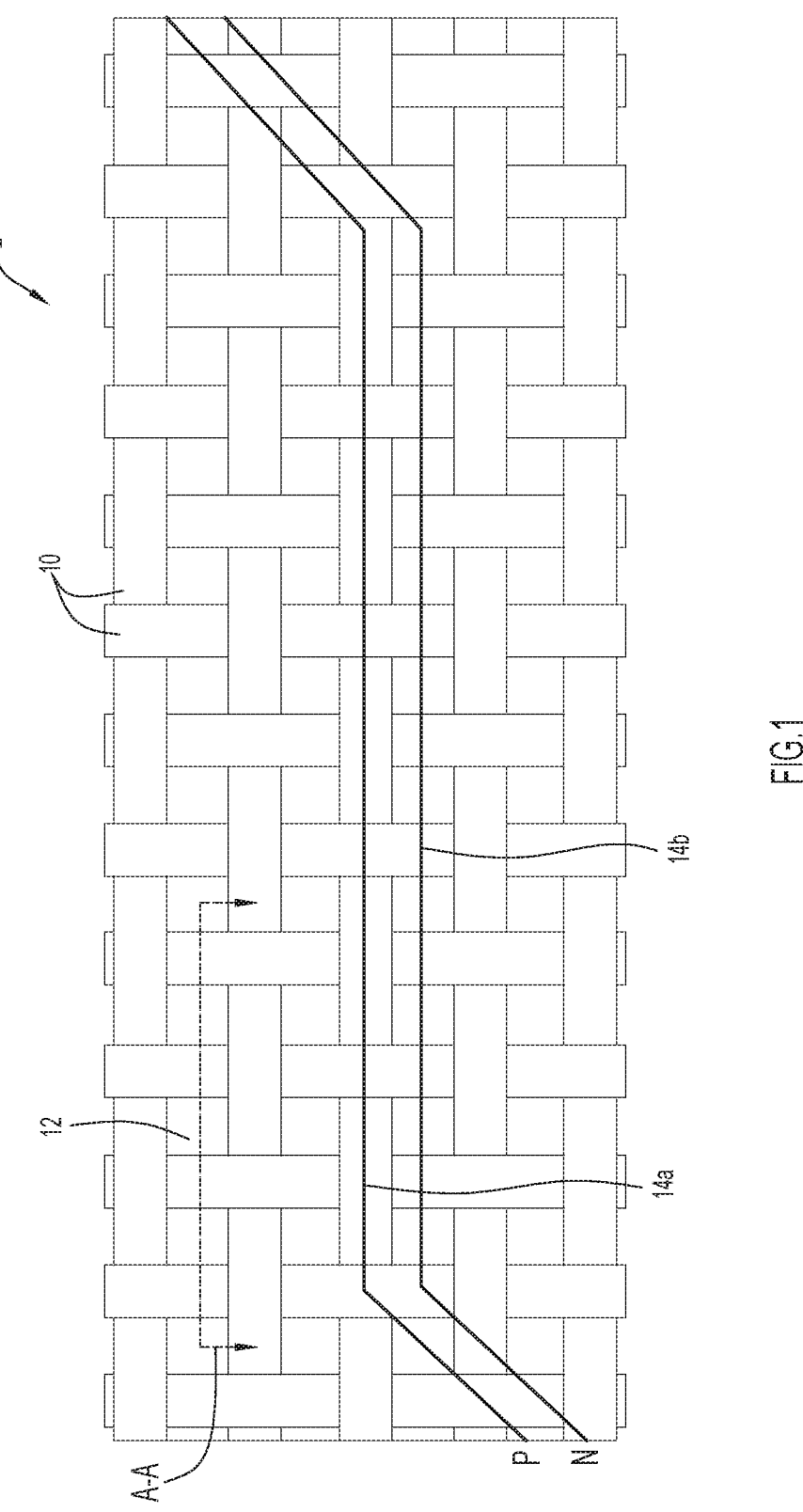
FIG. 1 depicts a top view of an embodiment of a portion of a glass weave laminate layer for a printed circuit board (PCB).

A typical printed circuit board (PCB) comprises a series of layers including one or more layers (e.g., B-stage or dielectric layers) formed as substrates or composite sheets that are constructed from various woven fiber fabrics strengthened and bound together with epoxy resin. For example, as shown in FIG. 1, a PCB laminate 2 is made up of woven yarns or fibers 10 of glass filaments impregnated with an epoxy resin 12. Electrical components, such as conductive traces (e.g., a pair of P and N traces 14a, 14b, as shown in FIG. 1) can be arranged in a signal layer adjacent the PCB laminate 2 of the PCB, where the conductive signal traces can be selectively aligned based upon the spacing, orientation, sizes, etc. of the fibers in the woven fabric layers.

Figure 2:
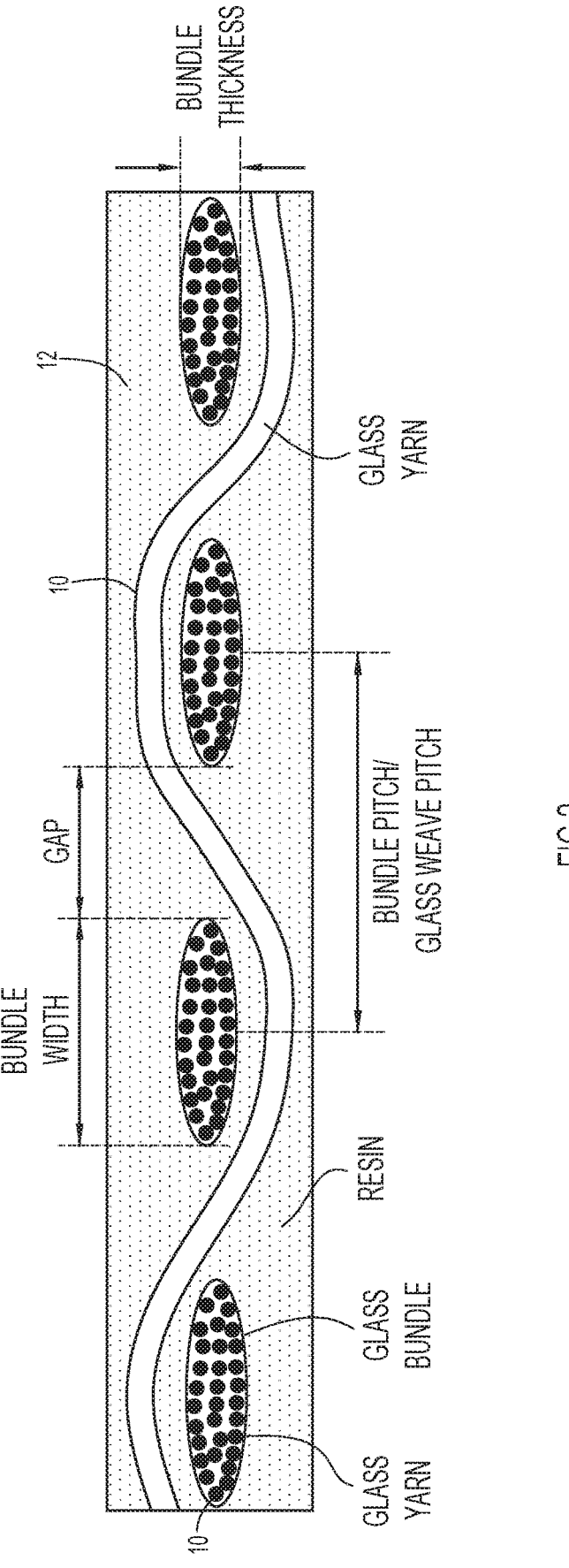
FIG. 2 depicts a cross-sectional view of the portion of a glass weave laminate layer along lines A-A of FIG. 1.

The woven yarns or fibers 10 of the PCB laminate 2 comprise bundles of glass filaments. FIG. 2 shows a cross-section of the composite sheet of FIG. 1, where the bundles or fibers 10 are surrounded by epoxy resin 12 and some bundles or fibers 10 are shown in cross-section showing the individual glass filaments that form a bundle. The bundle pitch/glass weave pitch for the woven fiber fabric is the distance between two adjacent, and generally parallel, bundles measured from center to center and may be calculated from bundle count per inch. A bundle width is the width of the bundle/fiber 10 within the epoxy resin 12. A gap is the distance between two parallel bundles or fibers 10 and a bundle thickness is the thickness (height) of the bundle as shown in FIG. 2. Marked bundles/fibers are provided at different locations within the woven fabric of the PCB laminate which, as described herein, are used to provide a precise source identification or authentication for the PCB. The bundle pitch, bundle gap, bundle thickness, and numbers and/or types of glass filaments (e.g., filament composition, filament size or denier, filament shape, filament color, etc.) can all be varied during the formation of the woven fabric for the PCB laminate so as to define marked bundles or marked fibers (also referred to herein as markers) within the woven fabric.

Figure 3:
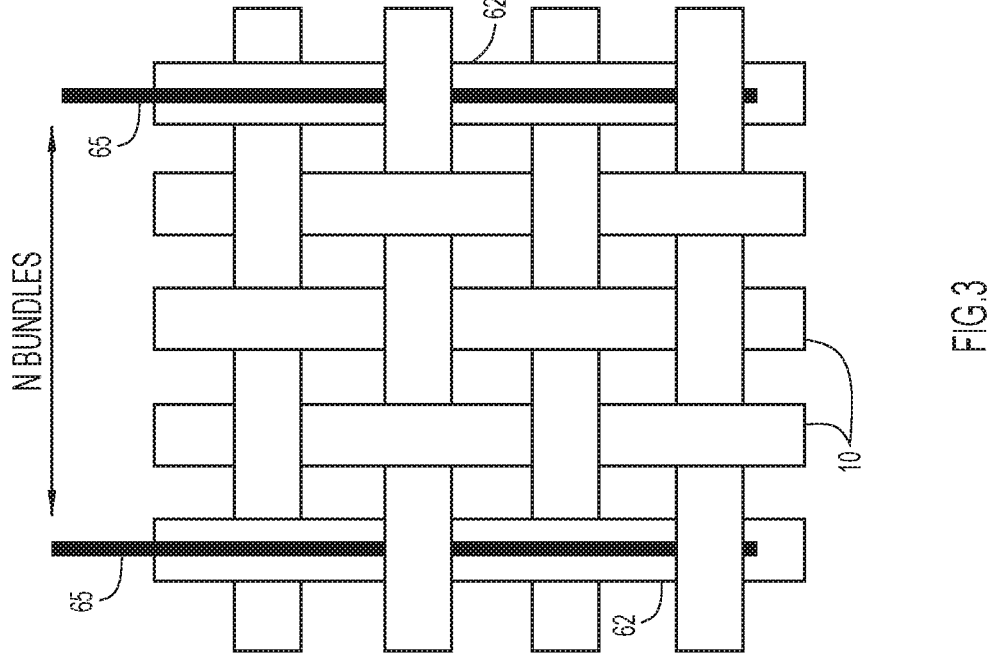
FIG. 3 depicts another top view of an embodiment of a portion of a glass weave laminate layer including glass bundles that are designated as markers which combine to define a marker structure as described herein.

An example method of forming a PCB including one or more glass weave and resin layers with markers at designated locations within one or more layers, as well as providing viewing windows for visual examination of certain markers formed within the one or more glass weave and resin layers, is now described. As shown in FIG. 3, a marker 65 can comprise a marked glass bundle or glass fiber having a different color, different size (e.g., diameter), different glass composition, different cross-sectional shape and/or any other configuration that results in a visual variation of the marker 65 in relation to other glass bundles or fibers 62 within the woven PCB laminate layer. For example, when the glass is woven, some of the yarns may be a different color or have a visible marker embedded therein or thereon (e.g., etched markings on a glass bundle, such as the markers 65 shown in FIG. 3). Different color wavelengths may be used for different glass styles. As shown in FIG. 3, one or more markers 65 can be inserted (during the weaving process) at every Nth interval along a warp and/or weft direction of the weave.

Figure 4:
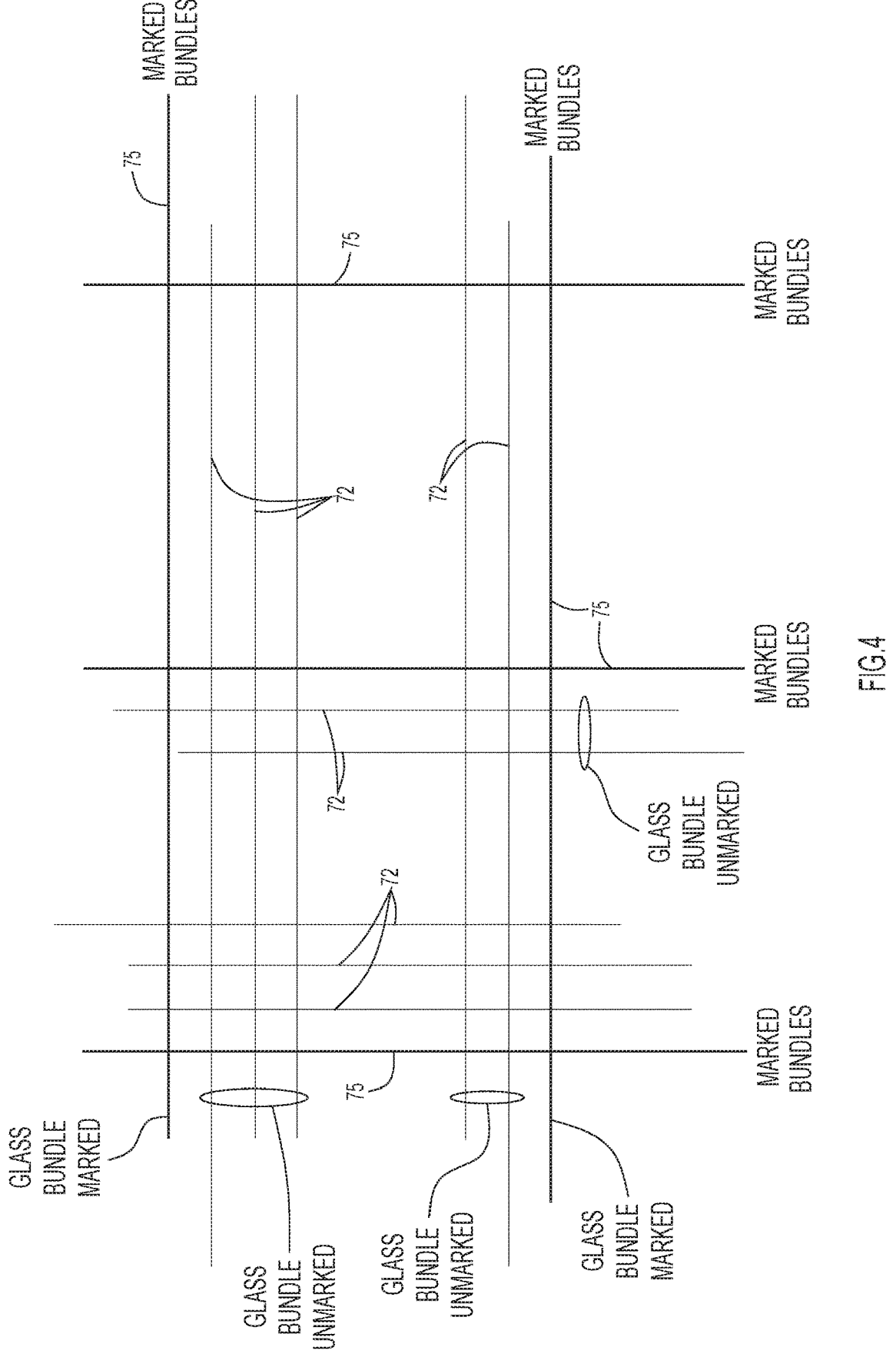
FIG. 4 depicts a further top view of an embodiment of a portion of a glass weave laminate layer including a layout of glass bundles/fibers including glass bundles that are designated as markers which combine to define a two-dimensional marker structure as described herein.

Another example embodiment in which markers are provided along both (warp and weft) directions of the woven layer is depicted in FIG. 4, which depicts a layout of glass bundles/fibers along a top view of a portion of a woven glass laminate layer that is integrated within a PCB. Markers can be provided at any suitable intervals, with any types of gaps, pitches, etc. being provided between consecutive parallel bundles. For example, a marker 75 can be provided between every $N^{th}$ interval of unmarked bundles or fibers 72 along a certain direction (e.g., weft direction). In the example depicted in FIG. 4, a marker 75 is provided at every $5^{th}$ interval, or with five unmarked bundles or fibers 72 between each marker 75. Similarly, markers 75 can also be provided at every $N^{th}$ interval of unmarked bundles or fibers 72 along another direction (e.g., warp direction). Markers 75 can also cross or overlap with each other in the warp and weft directions. The combinations of markers (i.e., locations, shapes, sizes and orientations of marked bundles or marked fibers, as well as controlled gaps, pitches, etc. associated with the combinations of markers) within the woven layer can form a unique two-dimensional marker structure within the woven layer (e.g., the marker structure is formed within a single woven glass laminate layer) which, when the woven layer is integrated within the PCB, can serve as an authentication identifier (authentication ID) for the PCB. Depending upon the unique properties or features of a marker, a marker structure can comprise a single marker (e.g., a single marked glass bundle or fiber) that serves as an authentication ID for the PCB. In addition, marker structures can be formed that include one or more marked bundles of marked fibers within woven glass laminate layers in combination with conductive traces and/or any other structure formed in other layers of the PCB that, when combined with the markers of the laminate layer(s), forms a unique visual pattern and thus a unique authentication ID for the PCB.

Figure 5A:
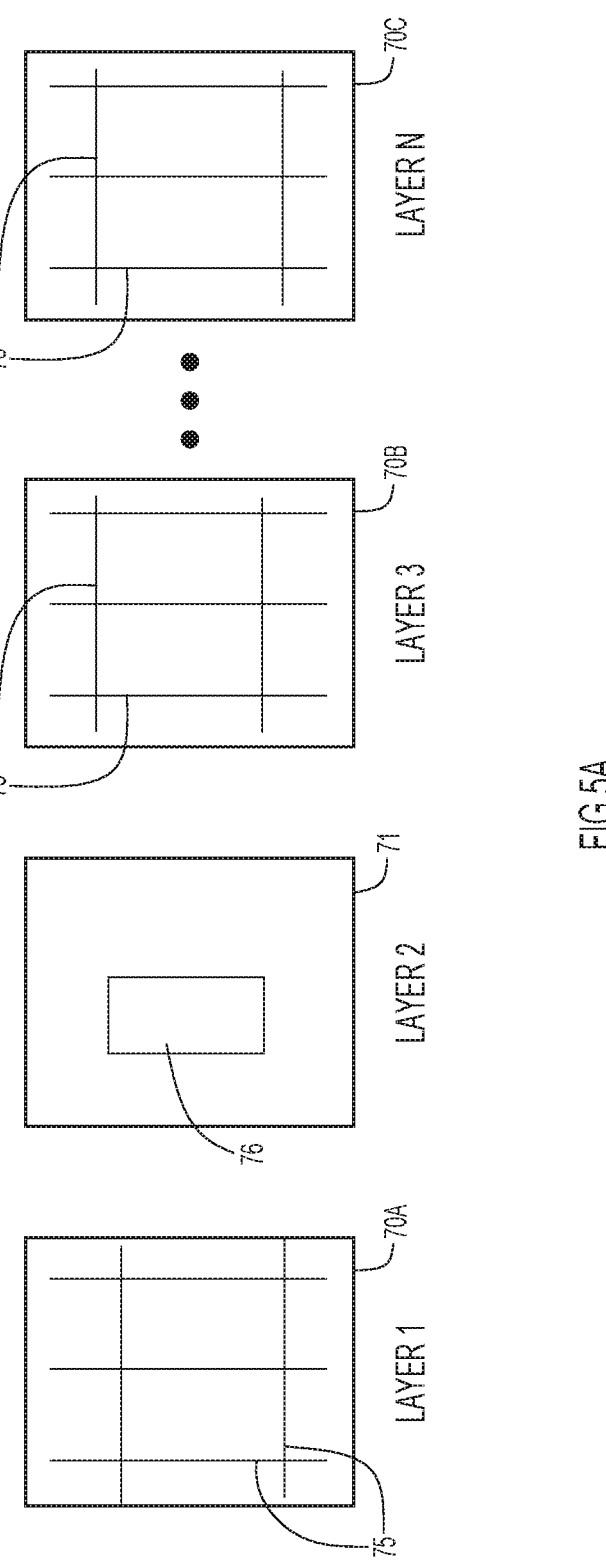
FIG. 5A depicts a series of layers that combine to form a PCB, where the layers include glass bundles that are designated as markers.
Figure 5B:
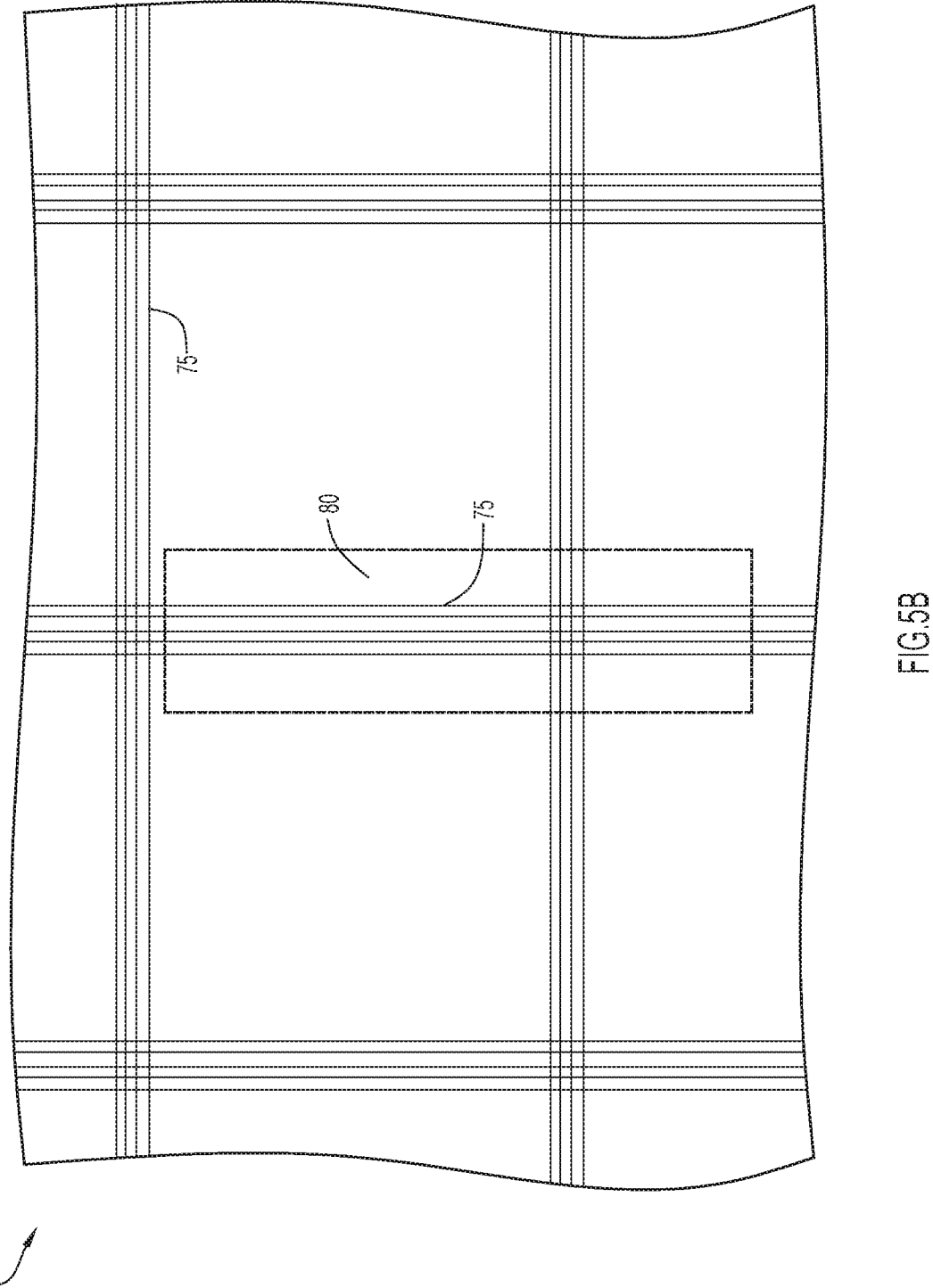
FIG. 5B depicts a top view of a portion of a PCB including the combination of stacked layers as shown in FIG. 5A and further showing an area that facilitates a visual view of an area along the PCB that includes an underlying three-dimensional marker structure.

A further example embodiment of a marker structure for a PCB is depicted in FIGS. 5A and 5B. A series of separate N layers is depicted in FIG. 5A, while FIG. 5B depicts a top view of a portion of the PCB that is formed including the series of N layers in a vertically stacked manner. For ease of reference, only the markers are depicted in each woven glass laminate layer of FIGS. 5A and B (i.e., the unmarked bundles or fibers are not shown in the laminate layers). In this example embodiment, groups of markers 75 within the different laminate layers are arranged in the warp and weft directions so as to form a three-dimensional marker structure for the PCB when the layers are combined together with other layers. The markers 75 can have different colors, different shapes and/or dimensions, different spacings or intervals between fibers in the warp or weft directions, etc. The layers forming the PCB can include one or more copper foil or copper sheet layers 71 (e.g., Layer 2 as shown in FIG. 5A) that at least partially overlie a woven glass laminate layer, and two or more woven glass laminate layers forming B-stage layers 70A, 70B, 70C for the PCB (e.g., Layer 1, Layer 3 and Layer N as shown in FIG. 5A). Markers 75 for each of the B-stage layers 70A, 70B and 70C extend in warp and weft directions of the layer and can be slightly offset from similarly arranged markers 75 in the other vertically stacked layers. When combined to form the PCB 78 (a top surface portion of the PCB 78 is shown in FIG. 5B), the similarly aligned markers 75 in the B-stage layers 70A, 70B, 70C that are vertically aligned with each other are slightly offset such that the markers 75 of each B-stage layer are visible at the top surface of the formed PCB. This provides a "bird's eye view" or top view of a three-dimensional marker structure formed by the combination of markers 75 from the different B-stage layers (i.e., the marker structure is formed by a plurality of markers located in a plurality of woven glass laminate layers that are in a vertically stacked alignment with each other).

To the extent any layer within the PCB might present a visual obstruction to the marker structure (e.g., a signal layer or other conductive layer that overlies a woven glass laminate layer with markers that form a portion of the marker structure), a cut-out portion corresponding with the location of the markers 75 in a woven glass laminate layer can be provided in the PCB structure. For example, copper sheet layer 71 (Layer 2 in FIG. 5) can include a cut-out section 76 that is formed in the same area of the copper sheet layer 71 that corresponds with the areas of B-stage layers 70A, 70B and 70C that include markers 75 which form the marker structure. The cut-out sections permit visual access to the underlying portion of the woven glass laminate layer(s) including marker(s) so as to provide visibility at the PCB top side through a selected depth (i.e., to a desired number of layers) within the PCB. The cut-out portions through such PCB structure can be provided without affecting the functionalities of stacked layers with regard to PCB operations. Referring to FIG. 5B, the cut-out section 76 of the copper sheet layer 71 corresponds with an area 80 defined along the top surface of the PCB. The area 80 encompasses markers 75 that extend in warp and weft directions so as to intersect with other markers 75 (e.g., in the same laminate layer or in two or more vertically laminate layers vertically displaced from each other).

The combination of a plurality of woven laminate layers (e.g., five woven laminate layers as shown in FIG. 5B) with markers provided in warp and/or weft directions of the weave for each layer (where markers 75 can also have different colors, different cross-sectional shapes and/or different thicknesses) results in a unique or "fingerprint" like three dimensional pattern of markers that combine to define a marker structure. The unique marker structure is also achieved by providing a suitable number of stacked layers with specific combinations of spacings or intervals between markers in warp and weft directions for each layer. The marker structure can be defined within one or more woven laminate layers at any selected area along the top surface of the PCB.

The unique marker structure comprising one or more markers arranged at a selected depth or at varying depths within the stacked woven laminate layer(s) of the PCB is useful for authentication of the PCB at varying manufacturing and/or use stages of the PCB. For example, the marker structure can be used to authenticate the PCB during manufacture, assembly and/or integration of components with the PCB. The marker structure can further be used to authenticate the PCB at any point of the life cycle for an electronic device that implements the PCB, such as at start-up or initialization of the PCB and/or the device implementing the PCB, at any PCB or device production stages, and at any post-production/shipment stages, including a Return Materials Authorization (RMA) stage (e.g., when the device is returned due to some fault condition) as well in other failure or other analysis scenarios.

Figure 6:
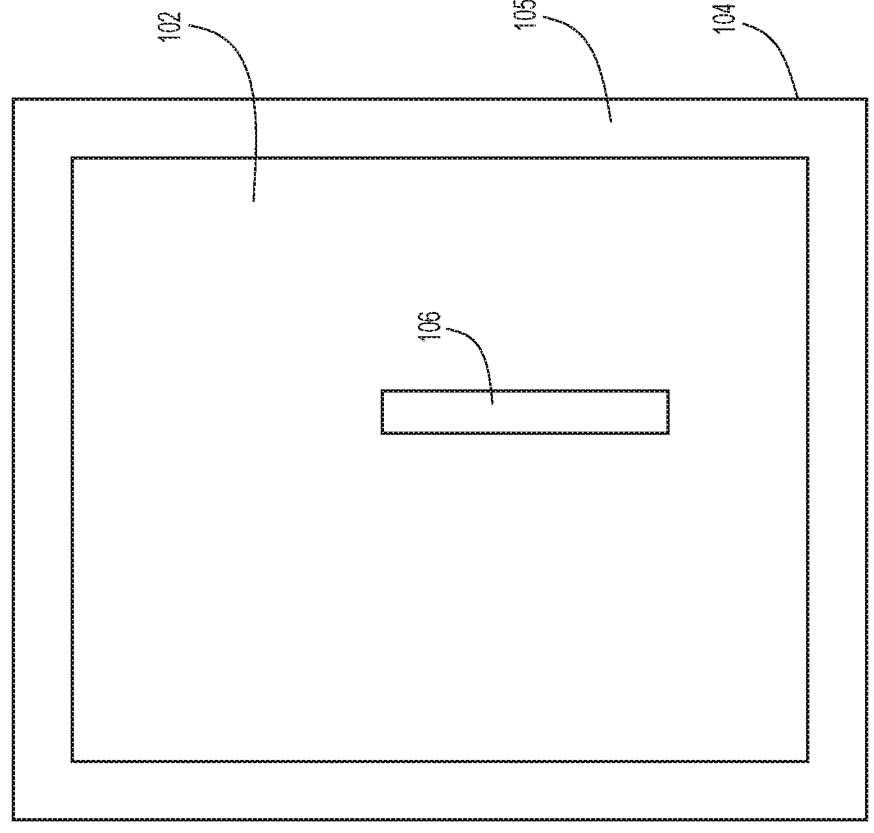
FIG. 6 depicts a top view of a PCB incorporating the layers of FIGS. 5A and 5B and further including an inspection window that facilitates capture of a visual or image or representation of the marker structure via the top surface of the PCB.
Figure 6:

One or more inspection windows are provided along a top surface of the PCB to facilitate viewing and/or capturing of an image of a marker structure formed within one or more woven glass laminate layers of the PCB (e.g., a two-dimensional marker structure formed within a single layer, or a three-dimensional marker structure formed within a plurality of layers). Referring to FIG. 6, a top view of a PCB 100 includes a circuit board 102 and an outer frame 104. The outer frame 104 extends around the circuit board 102 and includes a flow dam area 105 (the peripheral area between the outer edge of the outer frame 104 and the sides of the circuit board 102). An inspection window 106 is provided at a top surface area location of the circuit board 102 that also overlies a marker structure for the PCB 100. The PCB is further constructed such that the marker structure is visible through the inspection window for viewing and inspection. For example, the inspection window 106 can be formed along the external surface and/or within one or more PCB layers of the circuit board 102 so as to provide an inspection window with a clear view through one or more PCB layers to a specified location of markers within one or more woven glass laminate layers that define a two or three-dimensional marker structure. While only one inspection window is depicted in the embodiment of FIG. 6, it is noted that the PCB can include any selected number (e.g., one, two or more) of inspection windows arranged at suitable locations along the external top surface of the circuit board, where the inspection windows are arranged so as to directly overlie marker structures within the PCB.

The PCB 100 of FIG. 6 includes suitable components that facilitate capturing and recording a representation of the marker structure formed within the PCB. For example, referring to the schematic embodiment of FIG. 7, the PCB 100 includes a processor 110, a memory 120, an Application Specific Integrated Circuit (ASIC) 130, communication ports (e.g., network interface ports) 140 for the PCB 100, a security chip 150 coupled with the PCB, and an inspection tool 160 coupled with the PCB.

The inspection tool 160 is secured to a top surface of the PCB 100 and is coupled with the one or more inspection windows 106 in any suitable manner in order to provide an identification or representation of the unique fingerprint or pattern of markers that define the marker structure. The inspection tool can comprise an optical inspection tool or a non-optical inspection tool as described herein. In an example embodiment, the inspection tool 160 comprises one or more cameras with a suitable lens that captures an optical image or a plurality of optical images of the marker structure, where each captured image is visible or is available for access by the one or more cameras, via an inspection window. For example, the one or more cameras can detect different parts of the visible and non-visible spectrum so as to capture one or more optical images of the marker structure. The one or more cameras that capture optical images may include, without limitation, black and white cameras, color cameras, infrared cameras, ultraviolet cameras, and X-ray cameras. Thus, the inspection tool 160 can generate one or more optical images, such as a black and white image, a color image, an infrared image, an ultraviolet image and an X-ray image. In addition, three-dimensional (3D) information can be added using a variety of techniques, including, but not limited to, 3D cameras, laser cameras, and depth-from-focus. The inspection tool can also comprise a non-optical inspection tool that captures non-optical images. For example, non-optical images can be captured by an inspection tool that uses tomography, such as ultrasound (e.g., one or more Terahertz or THz imaging cameras) or X-rays (e.g., one or more X-ray cameras) to capture a detailed representation of the marker structure.

The image(s) captured by the inspection tool 160 can be stored as a visual representation of the marker structure, where the representation provides an authentication ID for the PCB that can be made available for later use as described herein. The image can be stored in a raw format and/or any suitable format (e.g., compressed formats such as JPEG, PNG, etc.). Depending upon the depths, arrangements and/or orientations of the markers defining the marker structure, the marker structure can also be captured and saved as any other suitable two-dimensional or three-dimensional representation. In some embodiments, the inspection tool 160 can generate an X-ray image, a 3D stereoscopic image, a plurality of images, or any other suitable visual representation that captures and provides information about the depths and orientations of specific markers defining the marker structure. In addition to a visual representation, other representations of the marker structure can also be stored and available for later use. For example, other representations of the marker structure include a Universal Product Code (UPC) or Quick Response (QR) code of the marker structure, a cryptographic hash of the marker structure and/or any other representative forms of the marker structure.

The memory 120 of the PCB 100 may comprise one or more integrated circuits or devices secured to the PCB comprising read only memory (ROM), random access memory (RAM), optical storage media devices, flash memory devices, electrical, optical, or other physical/tangible memory storage devices, and any combinations thereof. The processor 110 can comprise at least one microprocessor that executes control process logic instructions 124 stored within memory 120 including operational instructions and software applications stored within such memory. In general, the memory 120 may comprise one or more tangible (non-transitory) computer readable storage media (e.g., a memory device) encoded with software comprising computer executable instructions and when the software is executed (by the processor 110) it is operable to perform operations of the PCB (e.g., in combination with the ASIC 130). In particular, the memory 120 includes an inspection tool module 126 that controls operations of the inspection tool 160 as well as facilitates communication with the security chip 150 as described herein.

The ASIC 130 includes suitable components (e.g., integrated circuit or other suitable components) for performing processing functions specific to the PCB and the device in which the PCB is implemented. In an example embodiment where the device is a networking device, the PCB performs networking functions via components associated with the ASIC. The ASIC can utilize processor 110 or include its own microprocessor and memory as well as any other integrated circuit components to perform the ASIC operations. The communication ports 140 facilitate data signal communications between the PCB to other components external to the PCB and/or the device to which the PCB is implemented.

The security chip 150 can comprise an integrated circuit that is coupled with the PCB in any suitable manner and comprises a tamper resistant Trust Anchor Module (TAM) that prevents tampering or unauthorized access to functionalities of the TAM once it is formed and connected or coupled with the PCB. In particular, any attempt to access integrated circuit components within the security chip or TAM 150 or removal of the TAM 150 from the PCB 100 will result in non-operability of such components and the functionality of the TAM. Secured within the TAM 150 is a PCB authentication module 152 comprising memory that stores the PCB authentication ID, where the PCB authentication ID comprises the representation of the marker structure for the PCB 100. The PCB authentication ID can also include other authentication information associated with the PCB, such as a "fingerprint" or specific authentication identifier (ID) for the ASIC 130 and/or for other components integrated with the PCB 100. Thus, the security chip/TAM 150 includes secure information that can control the operability of such components based upon the fingerprint ID values associated with specific components as well as the fingerprint authentication ID of the PCB upon which the specific components are implemented for us. Depending upon the functionalities assigned to the TAM 150, the TAM can also optionally include its own microprocessor 154 as well as an inspection tool module 156 (both shown in dashed lines within the TAM 150). For example, the PCB 100 can be configured such that only the TAM 150 (via its processor 154 and module 156) controls operations of the inspection tool 160, only the processor 110 of the PCB (via module 126 stored within memory 120) controls operations of the inspection tool 160, or both the TAM 150 and the processor 110 of the PCB control operations of the inspection tool 160 (this is represented in FIG. 6 by the dashed lines between the inspection tool 160 and both the processor 110 and the TAM 150). In embodiments in which only the TAM 150 controls operation of the inspection tool 160, the image(s) captured by the inspection tool can be securely guarded, with such captured image(s) only being transmitted or transferred to and processed by the TAM 150.

Figure 7:
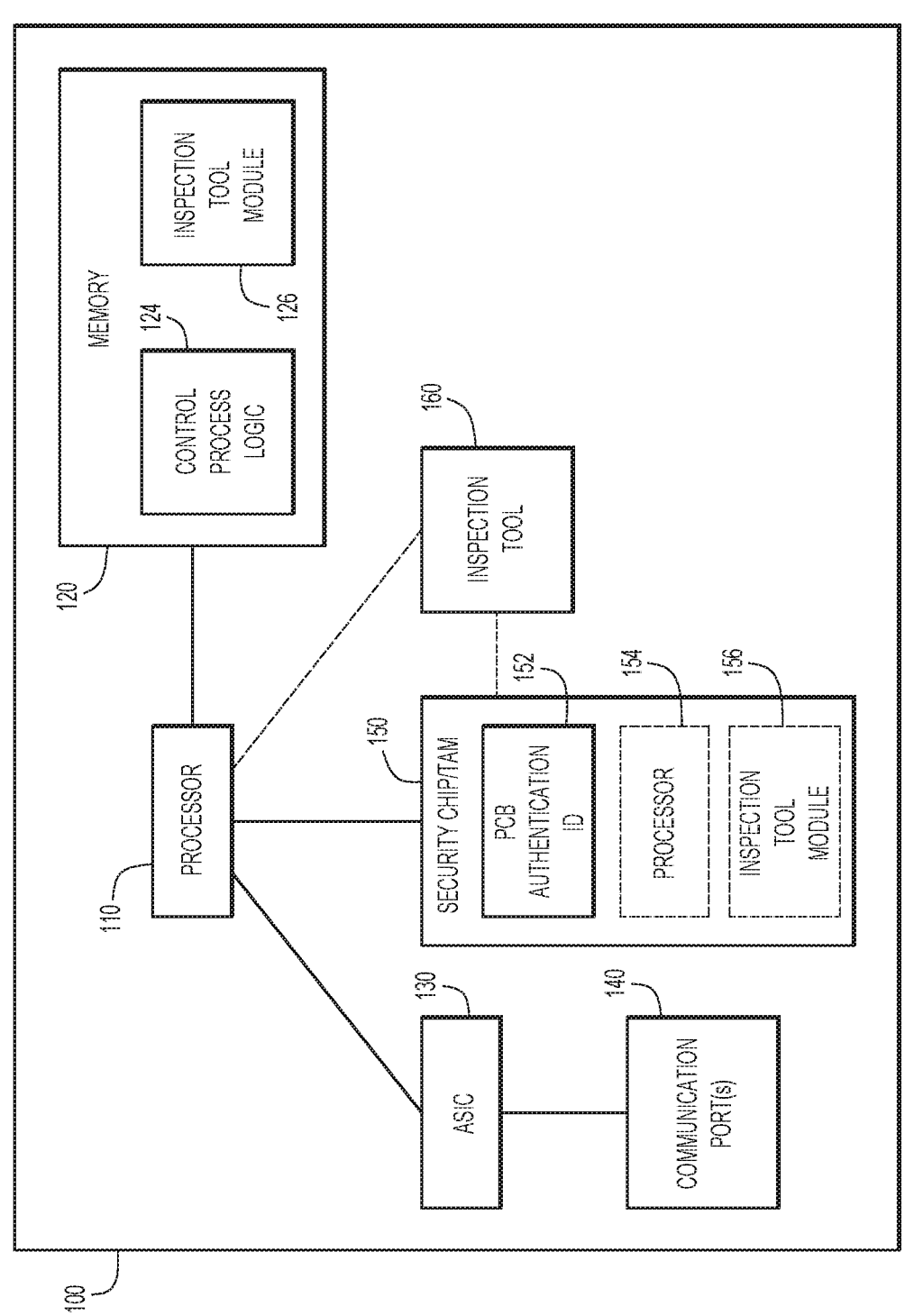
FIG. 7 is a schematic view of an example embodiment of a PCB including components that facilitate authentication of the PCB according to methods as described herein.
Figure 8:
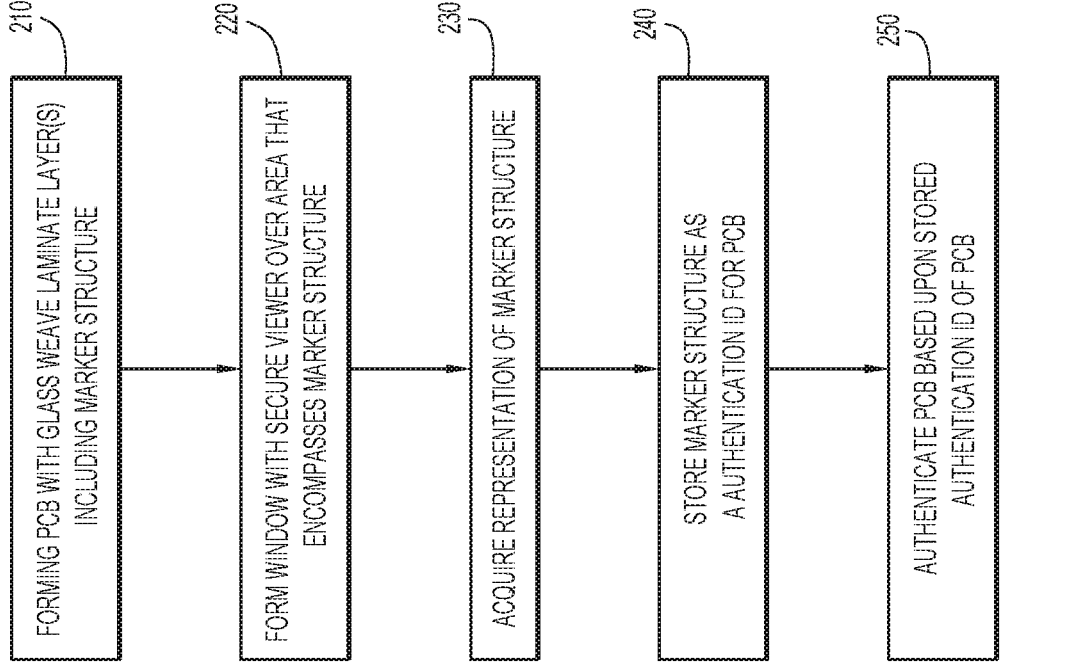
FIGS. 8 and 9 are flowcharts depicting a method of authenticating the PCB of FIG. 7 based upon one or more marker structures integrated within the PCB and a comparison with one or more representations of the marker structure(s) stored in the security chip of the PCB.

Operation of the PCB 100 of FIG. 7 is now described with reference to the flowcharts of FIGS. 8 and 9. The operational steps described in the flowcharts of FIGS. 8 and 9 can be performed automatically by one or more software applications of the PCB (e.g., one or more software applications stored within the PCB authentication module 152 of the TAM 150 and/or one or more software applications stored within the inspection tool module 126 of the memory 120 for the PCB 100). Referring to FIG. 8, at 210 a PCB is formed in the manner as described herein and as depicted in FIGS. 1-5, where a two-dimensional marker structure (e.g., as shown in FIG. 4) or a three-dimensional marker structure (e.g., as shown in FIGS. 5A and 5B) is formed within one or more woven glass laminate layers of the PCB as described herein. At 220, an exposed area is also formed in one or more layers of the PCB 100. The exposed area lies over and encompasses the marker structure to define an inspection window 106 at the top surface of the formed PCB 100.

At some manufacture stage of the PCB 100 (e.g., after all layers of the PCB 100 have been assembled or combined together), a representation of the marker structure is obtained or acquired at 230 (e.g., using the inspection tool module 126 and/or the inspection tool module 156 of the TAM 150). In particular, the inspection tool 160 is controlled (via the processor 110/inspection tool module 126 of the PCB 100 and/or via the processor 154/inspection tool module 156 of the TAM 150) to capture an image (or plurality of images) of the marker structure. The representation of the marker structure can comprise one or more images of the marker structure (e.g., saved as one or more digital images in a JPEG format, a PNG format, a TIFF format, or in any other suitable format). Alternatively, the representation of the marker structure can comprise some other form that is based or dependent upon the one or more images of the marker structure. For example, the representation can comprise a numeric value or function derived from the visual image(s) of the marker structure using some form of pattern recognition, feature detection and extraction and/or any other suitable technique that quantifies (e.g., by creating a pattern, a data vector and/or a data set assigned to) specific features of the marker structure.

In a non-limiting example embodiment, feature extraction can be performed for a marker structure so as to define a representation of the specific and unique features of the marker structure as a linear function (where the specific features of the marker structure are mapped to the linear function). In another non-limiting example embodiment, the representation of the marker structure can be obtained as a hash function of some numeric value or numerical function of the marker structure. In a further non-limiting example embodiment, the representation can comprise a graph that represents specific marker features within the marker structure, where subgraph isomorphisms can be used to match portions of the marker structure (for comparison purposes during authentication of the marker structure).

In some example embodiments, the representation of the marker structure for the PCB 100 can also be combined in some manner with other manufacturer secure identification (ID) or "fingerprint" information associated with one or more other electronic components of the PCB 100 (e.g., integrated circuit and/or other components of the ASIC 130). Secure ID information associated with specific components of the PCB 100 can comprise, e.g., confidential serial numbers for specific components. The representation of the marker structure and any other secure ID information associated with specific components of the PCB 100 can be combined, e.g., in a hash function or in some other numerical function or other suitable manner such that the representation further links the PCB with the specific electronic components that are linked with the PCB.

At 240, the representation that is acquired for the marker structure of the PCB 100 is stored as a unique authentication identifier (ID) for the PCB. The authentication ID is securely stored in the PCB authentication module 152 of the TAM

150 and is not readily accessible. For example, the authentication ID can be stored within the PCB authentication module 152 of the TAM 150 at the first power up of the PCB 100 in a manufacturing line process.

After the authentication ID for the PCB 100 has been securely stored within the TAM 150, further processing of the PCB occurs at 250, where an authentication of the PCB is required. The authentication ID stored in the TAM 150 (at step 240) can be used to authenticate the PCB at any later stage in the life cycle of the PCB. For example, the authentication (step 250) of the PCB 100 can occur when the PCB is first implemented with other components and/or installed within an electronic device (for example, during an initial boot up process of the PCB prior to its first use). Authentication can also occur at any other later production stage of the PCB, at any use/implementation stage of the PCB, at any post shipment/end user stage of the PCB, as well as at any point of use stage, such as a Return Materials Authorization (RMA) stage or any post use stage.

Figure 9:
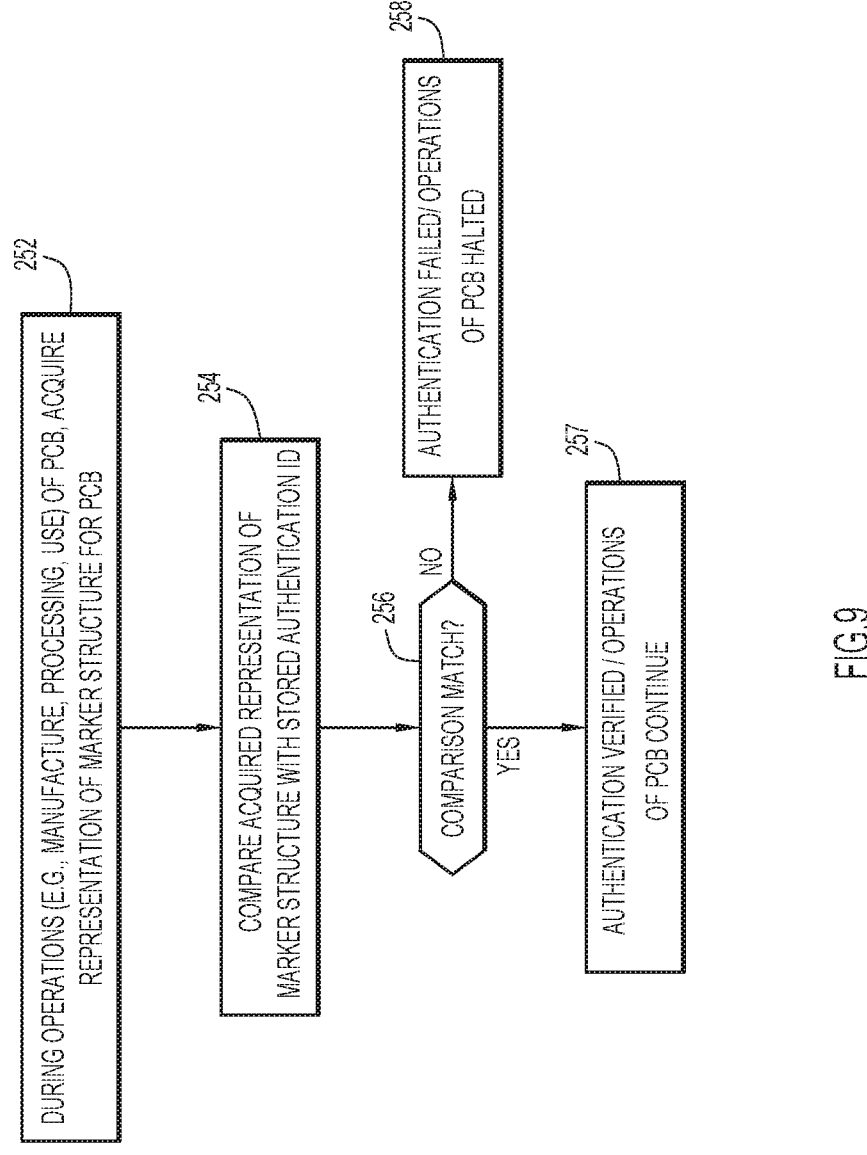

Authentication of the PCB (step 250) is described in further detail with the sub-steps as set forth in the flowchart of FIG. 9. At 252, during any manufacturing (post step 240), processing, distribution and/or end-of-point use (e.g., by consumer) as well as end of use life cycle stage(s) of the PCB, a representation of the marker structure for the PCB can be obtained or acquired. During this process step, the inspection tool 160, which is controlled by the processor 110 (via module 126) and/or processor 154 (via module 156), captures one or more images of the marker structure (via the inspection window 106 of the PCB 100). A representation of the marker structure is obtained (e.g., via the processor 110 and utilizing the inspection tool module 126). As previously noted, the representation of the marker structure can be the actual image(s) captured by the inspection tool 160. Alternatively, the representation of the marker structure can be one or more numerical values and/or based upon one or more numerical and/or hash functions, where the processing of the actual image(s) can be achieved based upon software operational instructions provided in either or both of the inspection tool module 126 within the memory 120 of the PCB 100 and the PCB authentication module 152 of the TAM 150. As previously noted, the PCB 100 can be configured such that only the TAM 150 controls operations of the inspection tool 160, such that any image(s) captured by the inspection tool are processed by the TAM 150 (thus maintaining very secure control over the authentication ID as well as the representation of the marker structure for authentication purposes during the series of sub-steps associated with step 250).

At 254, the acquired representation of the PCB marker structure (obtained by the inspection tool in step 252) is compared with the authentication ID of the PCB 100 which is stored in the PCB authentication module 152 of the TAM 150. Such processing operations can occur, e.g., solely within the TAM 150 (e.g., via processor 154 and utilizing PCB authentication ID module 152). Alternatively, processor 110 (utilizing module 126) can also assist in performing such comparison operations. At 256, a determination is made as to whether the acquired representation of the PCB marker structure matches the authentication ID of the PCB 100. In embodiments in which the representation and authentication ID comprise the actual image(s) of the marker structure, an overlay between the two sets of images utilizing suitable automated software operations can be performed (with software provided by one or both of the module 126 and the module 152) to determine whether a match exists. In embodiments in which the authentication ID comprises some numerical value(s) or numerical function associated with the image(s) of the PCB marker structure, the actual image(s) captured by the inspection tool at step 252 can be converted to a representation (utilizing software from module 126 and/or module 152) of the captured image(s) which is then compared with the stored authentication ID to determine whether a match exists (e.g., both numerical values or both numerical functions are equal to each other or within a defined tolerance limit of being equal with each other).

In response to a determination of a match between the stored authentication ID and the acquired representation of the marker structure (based upon steps 252 and 254), authentication of the PCB is verified at 257 and PCB operations are allowed to continue. Alternatively, in response to a determination that a match does not exist, at 258 an indication of an authentication failure results, which can further result in PCB operations being automatically shut down or halted. For example, the TAM 150 may include (in module 152) process control functions that are required in order for operation the ASIC 130, and such process control functions are only allowed when PCB authentication is verified. For example, during an initial start-up or boot up process of the PCB (where the authentication process of FIG. 9 is implemented), the TAM 150 can prevent the boot up process from occurring in response to an authentication failure (step 258). In such instances, a message can be provided by the processor 110 (via a communication port 140) of the PCB 100 to a display device associated with the PCB (or electronic device implementing the PCB) such as "Authentication Failure".

While the methods have been described herein in relation to the PCB of FIG. 7, it is noted that the PCB can be modified in any suitable manner and depending upon a particular application of use in a specific electronic device to include other components and/or exclude any of the components (e.g., the ASIC and communication ports) as depicted in FIG. 7. In essence, the methods and PCB configuration (including marker structure with techniques and/or structure disposed on the PCB that enable capturing a representation of the marker structure and/or storage of the representation in a security chip coupled with the PCB) can be implemented in any electronic device in which it is desired to facilitate effective authentication of the PCB during the life cycle of the PCB.

In addition, while the authentication steps of FIG. 9 only provide for two options (namely, authentication verified/proceed with PCB operations and authentication failure/halt PCB operations), these authentication steps are by example only and the methods can also provide a variety of additional options based upon other conditions. In a further example embodiment, the PCB and/or the electronic device in which the PCB is implemented may be damaged such that a representation of the marker structure for the PCB cannot be obtained and/or the stored authentication ID for the PCB cannot be acquired. In a situation in which there cannot be a reliable authentication of the PCB, an error message can be generated (e.g., via the processor and associated software of the PCB) indicating that an authentication validation cannot occur due to potential damage and/or providing instructions for contacting the manufacturer of the device for assistance. This scenario can also result in PCB operations being halted (since authentication still cannot be verified).

While the validation/authentication of the PCB has been described in the example embodiments when power is applied to the PCB (e.g., during boot up process), it is also possible to validate or authenticate the PCB in a powered off state. For example, the unique authentication ID of the PCB, in addition or alternative to being stored in the TAM 150 of the PCB 100, can be stored at another location separate from the TAM 150 (e.g., in a secure database of the manufacturer and/or other entity in the production or supply chain of the PCB). A representation of the marker structure for the PCB can then be obtained or acquired in a manner similar to that described herein (where the marker structure representation is acquired via an inspection tool that is powered by another device separate from the powered down PCB) and correlated with the specific value saved at another location to determine whether there is a match/validation/authentication. The authentication verification can then be performed based upon whether the acquired marker structure of the PCB matches the authentication ID.

The PCB configurations as described herein and corresponding methods of authentication of the PCB require the security chip/TAM to be associated with the PCB throughout the life cycle of the PCB in order for the ASIC and/or other components integrated with the PCB to be operable. This in essence prevents tampering with the PCB by removal of the security chip/TAM and/or other PCB components that are designated for use in a specific application and for a specific PCB, where such components and security chip/TAM might be attempted for use in another application and with another (e.g., counterfeit) PCB.

Thus, an example embodiment of an apparatus can comprise a printed circuit board (PCB) comprising a woven glass laminate layer, the woven glass laminate layer comprising a plurality of glass bundles woven together, where a marker structure can comprise at least one marker is defined within the woven glass laminate layer. The apparatus can further comprise a security chip coupled with the PCB and comprising memory that stores an authentication identifier (ID) of the PCB, the authentication ID comprising a representation of the marker structure. An electronic device can comprise the apparatus.

The marker structure of the PCB can comprise one or more marked glass bundles that are marked in a manner that is different from other glass bundles within the woven glass laminate layer. In addition, the PCB can comprise a plurality of vertically stacked woven glass laminate layers, and the marker structure can comprise a plurality of markers that are disposed in the plurality of woven glass laminate layers.

The authentication ID can comprise an image of the marker structure. The authentication ID can also comprise a numerical value or a numerical function representing an image of the marker structure.

The apparatus can further comprise an inspection tool coupled with the PCB, where the inspection tool captures an image of the marker structure that is used to generate the representation of the marker structure. The inspection tool can comprise a camera that generates an image of the marker structure selected from the group consisting of a black and white image, a color image, an infrared image, an ultraviolet image and an X-ray image.

The PCB of the apparatus can comprise an inspection window located at a surface area for a layer of the PCB that overlies the marker structure, and the inspection tool can be coupled with the PCB so as to overlie the inspection window.

The PCB of the apparatus can further comprise a conductive layer that at least partially overlies the woven glass laminate layer, where the conductive layer can include a cut-out portion that is aligned with the inspection window and the marker structure of the woven glass laminate layer.

In another example embodiment, a method can comprise obtaining a representation of a marker structure defined within a printed circuit board (PCB), where the PCB can comprise a woven glass laminate layer comprising a plurality of glass bundles woven together, and the marker structure can comprise at least one marker provided within the woven glass laminate layer. The method can further comprise storing the representation of the marker structure as an authentication identifier (ID) within a security chip coupled with the PCB.

The obtaining of the representation of the marker structure can further comprise obtaining one or more images of the marker structure using an inspection tool coupled with the PCB at a location that overlies the marker structure. The authentication ID can comprise the one or more images of the marker structure.

The storing the representation of the marker structure as the authentication ID in the method can further comprise obtaining a numerical value or numerical function that represents the one or more images of the marker structure, and storing within the security chip the numerical value or numerical function as the authentication ID. The numerical value or numerical function further can also represent information about another electronic component coupled with the PCB.

In a further example embodiment, a method can comprise obtaining a representation of a marker structure defined within a printed circuit board (PCB), where the PCB can comprise a woven glass laminate layer comprising a plurality of glass bundles woven together, and the marker structure can comprise at least one marker provided within the woven glass laminate layer. The method can further comprise comparing the representation of the marker structure with an authentication identifier (ID) to determine whether a match exists between the representation of the marker structure and the authentication ID. The authentication ID can be stored within a security chip that is coupled with the PCB.

The comparing the representation of the marker structure with the authentication ID of the method can further comprise, in response to a determination that the representation of the marker structure does not match the authentication ID, providing an indication of authentication failure for the PCB.

The obtaining of the representation of the marker structure of the method can further comprise obtaining one or more images of the marker structure using an inspection tool coupled with the PCB at a location that overlies the marker structure.

The PCB of the method can comprise a plurality of vertically stacked woven glass laminate layers, and the one or more images of the marker structure can be obtained as a plurality of markers that are disposed in the plurality of woven glass laminate layers.

Data relating to operations described herein (e.g., the capture and storage of an image or representation associated with a marker structure) may be stored within any conventional or other types of memory and/or other data structures (e.g., files, arrays, lists, stacks, queues, records, etc.) within the security chip and/or with other components associated with the PCB. Data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

Electronic devices implementing or associated with the PCB may employ any number of any type of user interface (e.g., Graphical User Interface (GUI), command-line, prompt, etc.) for obtaining or providing information (e.g., data relating to the formation and/or authentication of the PCB), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion in order to achieve formation of and/or authentication of the PCB, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems used to form and/or authenticate the PCB may be distributed in any manner among any number of software and/or hardware modules or units, processing or computer systems and/or circuitry, where the computer or processing systems may be disposed locally or remotely of each other and communicate via any suitable communications medium (e.g., LAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Any communication network associated with the methods described herein may be implemented by any number of any type of communications network (e.g., LAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

Electronic devices associated with the PCB may employ any number of any conventional or other databases, data stores or storage structures (e.g., files, databases, data structures, data or other repositories, etc.) to store information (e.g., data relating to authentication of the PCB, such as images and/or other representations of marker structures). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as an apparatus, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., associated with the PCB) may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and/or block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a printed circuit board (PCB) comprising a layer, wherein a marker structure comprising a combination of markers is defined within the layer, each marker is provided at a predetermined interval along the layer and has one or more unique properties, wherein the layer comprises a plurality of bundles of fibers combining to form the layer, and the marker structure comprises bundles of fibers provided at a location within the layer that differ in composition, size, and shape in relation to bundles of fibers provided within the layer outside the location; and
   a security chip coupled with the PCB and comprising memory that stores an authentication identifier (ID) of the PCB, the authentication ID comprising:
      a graph that represents the one or more unique properties of each marker within the marker structure, or
      a hash function of a numerical value representing an image of the marker structure.

2. The apparatus of claim 1, wherein the PCB comprises a plurality of vertically stacked layers, and the marker structure comprises a plurality of markers that are disposed in the plurality of vertically stacked layers.

3. The apparatus of claim 1, wherein the one or more unique properties comprise one or more of a color, location, shape, size or orientation of a plurality of glass bundles.

4. The apparatus of claim 1, wherein the graph is compared with a representation of the marker structure using subgraph isomorphism to determine whether a match exists between the representation of the marker structure and the authentication ID.

5. The apparatus of claim 1, wherein the hash function is a cryptographic hash function.

6. An apparatus comprising:

a printed circuit board (PCB) comprising a woven glass laminate layer, the woven glass laminate layer comprising a plurality of glass bundles woven together, wherein a marker structure comprising a combination of markers is defined within the woven glass laminate layer, each marker is provided at a predetermined interval along the woven glass laminate layer and has one or more unique properties, wherein the woven glass laminate layer comprises a plurality of woven glass filaments, and the marker structure comprises a location along the woven glass laminate layer in which one or more bundles of filaments at the location differ from other bundles of filaments outside of the location by filament composition, filament size, and filament shape; and a security chip coupled with the PCB and comprising memory that stores an authentication identifier (ID) of the PCB, the authentication ID comprising:

a graph that represents the one or more unique properties of each marker within the marker structure, or a hash function of a numerical value representing an image of the marker structure.

7. The apparatus of claim 6, wherein the marker structure comprises one or more marked glass bundles that are marked in a manner that is different from other glass bundles within the woven glass laminate layer.

8. The apparatus of claim 6, wherein the PCB comprises a plurality of vertically stacked woven glass laminate layers, and the marker structure comprises a plurality of markers that are disposed in the plurality of vertically stacked woven glass laminate layers.

9. The apparatus of claim 6, further comprising an inspection tool coupled with the PCB, wherein the inspection tool captures the image of the marker structure.

10. The apparatus of claim 9, wherein the inspection tool comprises a camera that generates the image of the marker structure selected from the group consisting of a black and white image, a color image, an infrared image, an ultraviolet image and an X-ray image.

11. The apparatus of claim 9, wherein the PCB comprises an inspection window located at a surface area for a layer of the PCB that overlies the marker structure, and the inspection tool is coupled with the PCB so as to overlie the inspection window.

12. The apparatus of claim 11, wherein the PCB further comprises a conductive layer that at least partially overlies the woven glass laminate layer, wherein the conductive layer includes a cut-out portion that is aligned with the inspection window and the marker structure of the woven glass laminate layer.

13. An electronic device comprising the apparatus of claim 6.

14. The apparatus of claim 6, wherein the markers are arranged at a selected depth.

15. The apparatus of claim 6, wherein the graph is compared with a representation of the marker structure using subgraph isomorphism to determine whether a match exists between the representation of the marker structure and the authentication ID.

16. The apparatus of claim 6, wherein the hash function is a cryptographic hash function.

17. The apparatus of claim 6, wherein the PCB is authenticated based on the marker structure during an initialization of the PCB.

18. The apparatus of claim 6, wherein the PCB is authenticated based on the marker structure during a production of the PCB.

19. A method comprising:

obtaining a representation of the marker structure defined within the printed circuit board (PCB) of the apparatus of claim 6; and comparing the representation of the marker structure with the authentication identifier (ID) to determine whether a match exists between the representation of the marker structure and the authentication ID.

20. The method of claim 19, wherein the comparing the representation of the marker structure with the authentication ID further comprises:

in response to a determination that the representation of the marker structure does not match the authentication ID, providing an indication of authentication failure for the PCB.

21. The method of claim 19, wherein the obtaining of the representation of the marker structure further comprises obtaining one or more images of the marker structure using an inspection tool coupled with the PCB at a location that overlies the marker structure.

22. The method of claim 21, wherein the PCB comprises a plurality of vertically stacked woven glass laminate layers, and the one or more images of the marker structure are obtained as a plurality of markers that are disposed in the plurality of vertically stacked woven glass laminate layers.

* * * * *